US012386955B2

(12) United States Patent
Ma et al.

(10) Patent No.: US 12,386,955 B2
(45) Date of Patent: Aug. 12, 2025

(54) ABNORMAL BEHAVIOR DETECTION METHOD, ELECTRONIC DEVICE AND NON-TRANSIENT COMPUTER-READABLE STORAGE MEDIUM

(71) Applicant: DOUYIN VISION CO., LTD., Beijing (CN)

(72) Inventors: Jun Ma, Beijing (CN); Yue Chen, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/796,334

(22) Filed: Aug. 7, 2024

(65) Prior Publication Data

US 2025/0053649 A1    Feb. 13, 2025

(30) Foreign Application Priority Data

Aug. 7, 2023   (CN) .......................... 202310988906.8

(51) Int. Cl.
  *G06F 21/55*  (2013.01)
  *H04L 9/40*   (2022.01)

(52) U.S. Cl.
  CPC ........ *G06F 21/554* (2013.01); *H04L 63/1425* (2013.01)

(58) Field of Classification Search
  CPC .. G06F 21/554; G06F 11/3452; G06F 21/316; H04L 63/1425; H04L 41/16
  See application file for complete search history.

(56) References Cited

U.S. PATENT DOCUMENTS 9,355,306 B2 *  5/2016  Wu ........................ G06V 40/23
10,341,391 B1   7/2019  Pandey et al.
(Continued)

FOREIGN PATENT DOCUMENTS

CN    109977319 A    7/2019
CN    112287339 A    1/2021
(Continued)

OTHER PUBLICATIONS

2018 IEEE International Conference on Energy Internet (ICEI) Year: 2018 | Conference Paper | Publisher: IEEEWang et al., "Network Behavior Abnormal Detection for Electricity Management System Based on Long Short-Term Memory,".*
(Continued)

*Primary Examiner* — Roderick Tolentino
(74) *Attorney, Agent, or Firm* — BakerHostetler

(57) ABSTRACT

The present disclosure provide an abnormal behavior detection method, an electronic device and a non-transient computer-readable storage medium. The method includes: collecting a set of behaviors to be detected that belong to a same session within a preset time window; labeling each behavior in the set of behaviors to be detected, and acquiring label features of the set of behaviors to be detected according to labels of all behaviors in the set of behaviors to be detected; mapping, according to a preset embedded feature extracting model, the label features of the set of behaviors to be detected as embedded features; and determining, based on the embedded features of the set of behaviors to be detected and embedded features of a pre-acquired set of historical behaviors, whether there is abnormality in the set of behaviors to be detected.

20 Claims, 5 Drawing Sheets

(56) References Cited

U.S. PATENT DOCUMENTS

| | | | |
|---|---|---|---|
| 11,385,996 B1* | 7/2022 | Bartling | G06F 11/3466 |
| 2016/0191559 A1* | 6/2016 | Mhatre | G06F 12/14 |
| | | | 726/23 |
| 2019/0188212 A1* | 6/2019 | Miller | H04L 63/145 |
| 2020/0081908 A1 | 3/2020 | Huang et al. | |
| 2020/0192682 A1* | 6/2020 | Kang | G06F 9/44505 |
| 2023/0177151 A1* | 6/2023 | Khan | G06F 21/566 |
| | | | 726/22 |
| 2024/0089278 A1* | 3/2024 | Claireaux | G06F 21/552 |
| 2024/0220808 A1* | 7/2024 | Kim | G06N 3/08 |
| 2024/0223479 A1* | 7/2024 | Grushka | H04L 43/04 |
| 2024/0298193 A1* | 9/2024 | Nie | H04W 24/02 |

FOREIGN PATENT DOCUMENTS

| | | |
|---|---|---|
| CN | 113032774 A | 6/2021 |
| CN | 111953712 B | 3/2022 |
| CN | 114124412 A | 3/2022 |
| CN | 115169583 A | 10/2022 |
| CN | 116070206 A | 5/2023 |
| CN | 116451050 A | 7/2023 |
| WO | WO 2023/040975 A1 | 3/2023 |

OTHER PUBLICATIONS

Guo et al., "Toward Anomaly Behavior Detection as an Edge Network Service Using a Dual-Task Interactive Guided Neural Network," IEEE Internet of Things Journal Year: 2021 | vol. 8, Issue: 16 | Journal Article | Publisher: IEEE.*

International Patent Application No. PCT/CN2024/110289; Int'l Search Report; dated Oct. 11, 2024; 10 pages.

China Patent Application No. 202310988906.8; First Office Action; dated Apr. 3, 2025; 21 pages.

China Patent Application No. 202310988906.8; Second Office Action; dated Jun. 25, 2025; 22 pages.

* cited by examiner

ABNORMAL BEHAVIOR DETECTION METHOD, ELECTRONIC DEVICE AND NON-TRANSIENT COMPUTER-READABLE STORAGE MEDIUM

CROSS-REFERENCE TO RELATED APPLICATION

The present disclosure claims the priority and benefits of Chinese patent application No. 202310988906.8 entitled "ABNORMAL BEHAVIOR DETECTION METHOD, DEVICE AND STORAGE MEDIUM" and filed in Chinese Patent Office on Aug. 7, 2023, the entirety of which is incorporated into the present disclosure by reference.

TECHNICAL FIELD

The embodiments of the present disclosure relate to the technical field of computer and network communication, in particular to a method, device and storage medium for abnormal behavior detection.

BACKGROUND

Abnormal behavior detection is an important function of host intrusion detection system, which intends to discover unknown abnormal behaviors that deviate from the baseline. Host intrusion detection system can collect various levels of host data, including system call, file creation, file reading and writing, command execution, network connection, etc.

The existing abnormal behavior detection schemes, which primarily rely on data such as execution command sequence, system call sequence and process creation, and use methods such as statistics, machine learning or deep learning to perform abnormality detection. However, the existing abnormal behavior detection schemes have low accuracy and are prone to false positives.

SUMMARY

In an aspect, one or more embodiments of the present disclosure provide an abnormal behavior detection method, comprising:
  collecting a set of behaviors to be detected that belong to a same session within a preset time window;
  labeling each behavior in the set of behaviors to be detected to identify attribute information of each behavior, and acquiring label features of the set of behaviors to be detected according to labels of all behaviors in the set of behaviors to be detected;
  mapping, according to a preset embedded feature extracting model, the label features of the set of behaviors to be detected into embedded features; and
  determining, based on the embedded features of the set of behaviors to be detected and embedded features of a pre-acquired set of historical behaviors, whether there is abnormality in the set of behaviors to be detected.

In an aspect, one or more embodiments of the present disclosure provide an abnormal behavior detection device, comprising:
  a collection unit, configured to collect a set of behaviors to be detected that belong to a same session within a preset time window;
  a label processing unit, configured to label each behavior in the set of behaviors to be detected to identify attribute information of each behavior, and acquire label features of the set of behaviors to be detected according to labels of all behaviors in the set of behaviors to be detected;
  a mapping unit, configured to map, according to a preset embedded feature extracting model, the label features of the set of behaviors to be detected into embedded features; and
  an abnormality recognition unit, configured to determine, based on the embedded features of the set of behaviors to be detected and embedded features of a pre-acquired set of historical behaviors, whether there is abnormality in the set of behaviors to be detected.

In an aspect, one or more embodiments of the present disclosure provide an electronic device, comprising: at least one processor and a memory;
  the memory stores computer-executable instructions;
  the at least one processor executes the computer-executable instructions stored in the memory, so that the at least one processor performs the abnormal behavior detection method of the aspects and various possible designs of the aspects.

In an aspect, one or more embodiments of the present disclosure provide a computer-readable storage medium, having stored therein computer-executable instructions which, when executed by a processor, implement the abnormal behavior detection method of the aspects and various possible designs of the aspects.

In an aspect, one or more embodiments of the present disclosure provide a computer program product, comprising computer-executable instructions which, when executed by a processor, implement the abnormal behavior detection method of the aspects and various possible designs of the aspects.

BRIEF DESCRIPTION OF DRAWINGS

In order to illustrate the embodiments of the present disclosure or the technical schemes in the prior art more clearly, the accompanying drawings required to be used in the description of the embodiments or the prior art will be briefly introduced below. Obviously, the accompanying drawings in the following description are some of the embodiments of the present disclosure, and for those ordinary skilled in the art, according to such accompanying drawings, other drawings can also be obtained without creative efforts.

DETAILED DESCRIPTION

Figure 1:
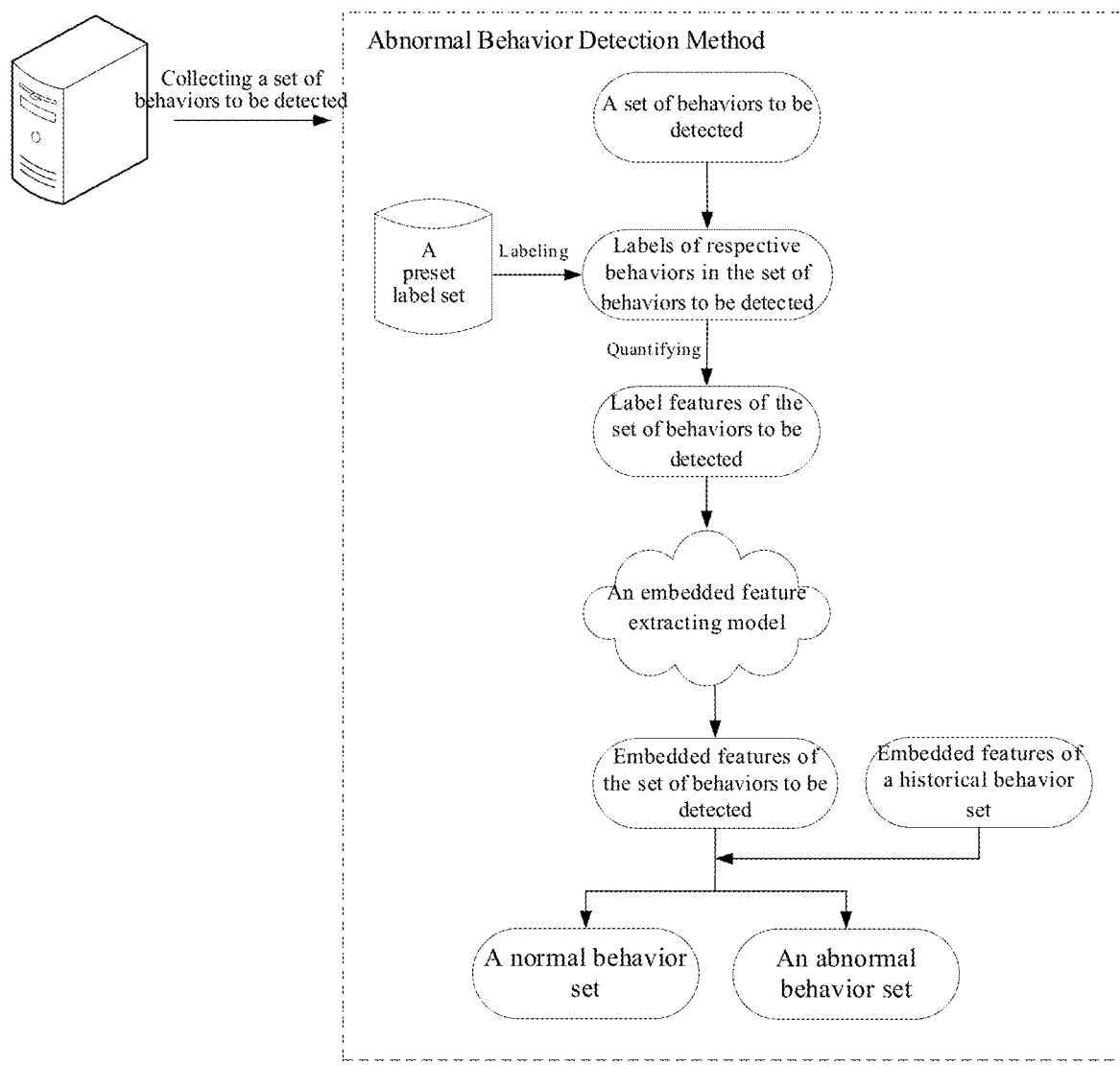
FIG. 1 is an example diagram of a scenario of an abnormal behavior detection method provided by an embodiment of the present disclosure.

In order to make the purposes, technical schemes and advantages of the embodiments of the present disclosure clearer, in the following, a clear and complete description of the technical schemes in the embodiments of the present disclosure will be made in conjunction with the accompanying drawings in the embodiments of the present disclosure. Obviously, the described embodiments are a part of the embodiments of the present disclosure, but not all of the embodiments. Based on the embodiments in the present disclosure, all the other embodiments obtained by those ordinary skilled in the art on the premise that no creative labor is given belong to the protection scope of the present disclosure.

Abnormal behavior detection is an important function of host intrusion detection system, which intends to discover unknown abnormal behaviors that deviate from the baseline. Host intrusion detection system can collect various levels of host data, including system call, file creation, file reading and writing, command execution, network connection, etc.

The existing abnormal behavior detection schemes, which primarily rely on data such as execution command sequence, system call sequence and process creation, and use methods such as statistics, machine learning or deep learning to perform abnormality detection.

A statistics-based scheme may specifically calculate a frequency at which a certain behavior or a certain combination of behaviors appears in the past, and take the behavior and combination of behaviors with lower frequency of appearance as abnormality. A machine learning and deep learning based scheme may first convert natural language data such as command sequence, process creation, etc., into eigenvectors, and then perform clustering or classifying thereon, generally in an unsupervised/self-supervised manner, for example:

performing clustering on behavior data by means of clustering algorithms, to obtain a plurality of category clusters, in which a category with a larger number of samples within this category is a normal behavior category, and a category with a smaller number of samples within this category is an abnormal behavior category;

performing encoding and decoding operations on behavior data through an AutoEncoder model, and making the result output of the decoder as approximate as possible to the input of the encoder by setting a loss function. Since most of the behavior data collected in a real production network environment belong to normal behaviors, the AutoEncoder model has been trained more sufficiently in terms of encoding and decoding of normal behavior data, and there is little difference between the output of the decoder and the input of the encoder for the model; however, with few abnormal behaviors, the AutoEncoder model has not been trained sufficiently in terms of encoding and decoding of abnormal behavior data, and there is a great difference between the output of the decoder and the input of the encoder for the model. Therefore, abnormal behaviors can be screened out by setting a threshold for the difference between the input and output for the model.

However, whether statistically computing the behavior data directly or converting it into eigenvectors before clustering or training models, an issue will appear that false positives are of a large number due to the great complexity of host commands or process sequences in real scenarios. For example, a certain rare command parameter or file path might be determined as abnormal behavior, but actually it is not. If the types of the statistical data are strictly screened and restricted (i.e., only a limited number of system calls are considered), the data may fail to sufficiently describe and distinguish massive and complex normal behaviors and unknown abnormal behaviors.

In order to improve accuracy of abnormal behavior detection and effectively avoid false positives, the present disclosure provides an abnormal behavior detection method, which includes: collecting a set of behaviors to be detected that belong to a same session within a preset time window; labeling each behavior in the set of behaviors to be detected, and acquiring label features of the set of behaviors to be detected according to labels of all behaviors in the set of behaviors to be detected; mapping, according to a preset embedded feature extracting model, the label features of the set of behaviors to be detected as embedded features; determining, based on the embedded features of the set of behaviors to be detected and embedded features of a pre-acquired set of historical behaviors, whether there is abnormality in the set of behaviors to be detected. This method realizes, by means of labeling, the representation in natural language of respective behaviors in the set of behaviors to be detected, enhancing the readability of behavior data; in turn, quantifies the labels of all behaviors in the set of behaviors to be detected into label features, and then maps them into embedded features, sufficiently describing the features of the set of behaviors to be detected, achieving a strong interpretability; and performs abnormal behavior recognition based on the embedded features, improving the accuracy of recognition and reducing the occurrence of false positives, which is applicable to abnormal behavior detection of massive behavior data in real scenarios.

The abnormal behavior detection method of the present disclosure is applied to electronic devices such as servers. As shown in FIG. 1, this method may acquire a set of behaviors to be detected that belong to a same session within a preset time window, and then determine, by adding labels, constructing label features and extracting embedded features and based on the embedded features of the set of behaviors to be detected and the embedded features of the pre-acquired set of historical behaviors, whether there is abnormality in the set of behaviors to be detected.

The abnormal behavior detection method of the present disclosure will be described in detail in conjunction with specific embodiments.

Figure 2:
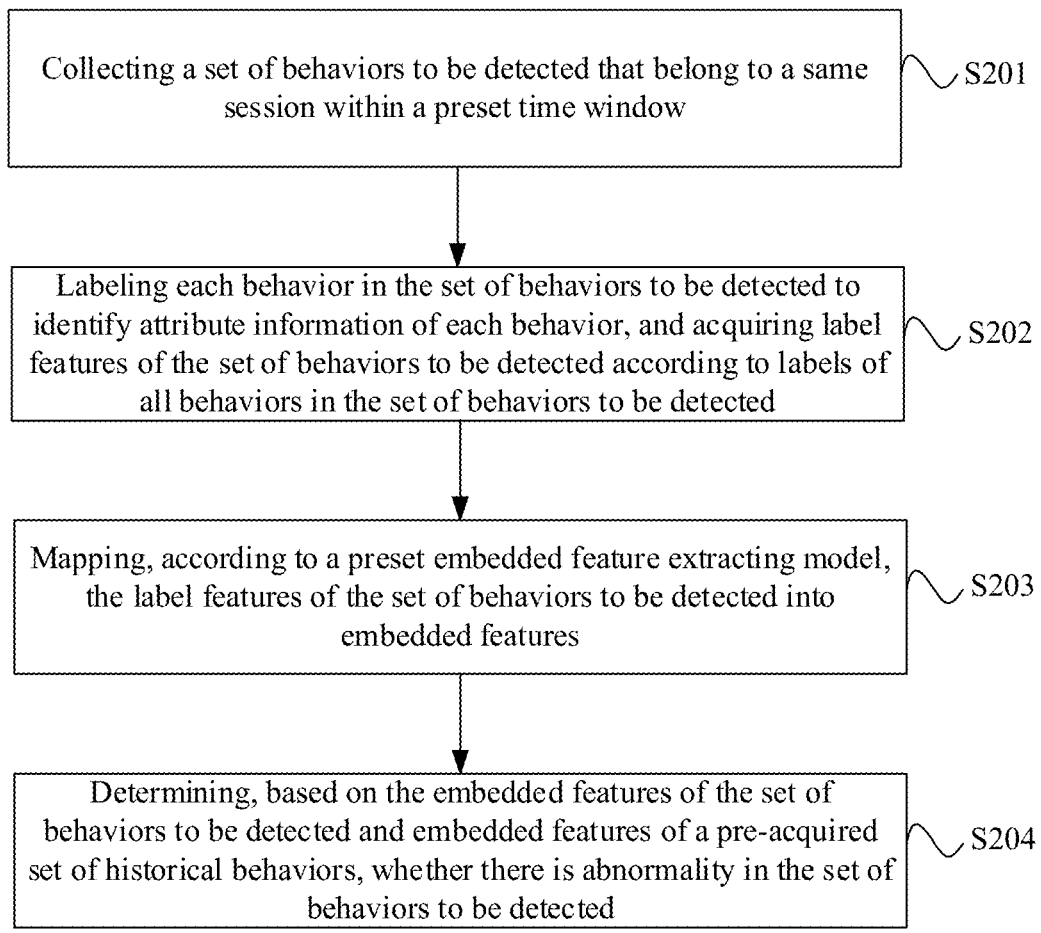
FIG. 2 is a flowchart of an abnormal behavior detection method provided by an embodiment of the present disclosure.

Referring to FIG. 2, FIG. 2 is a flowchart of an abnormal behavior detection method provided by an embodiment of the present disclosure. The method of this embodiment can be applied to electronic devices such as servers, in which the abnormal behavior detection method includes:

S201: collecting a set of behaviors to be detected that belong to a same session within a preset time window.

In this embodiment, behavior data may be collected in real time for a target host, for example, a Host-based Intrusion Detection System (HIDS) or another detection system is employed to collect behavior data in real time for a target host. Further, considering that the behaviors in the same session are associated to some extent, especially that there are usually many other malicious behaviors in the session with intrusion behaviors, behavior data within a preset time window (such as 60 minutes) is selected from the behavior data of the same session on the same host, to obtain a set of behaviors as the set of behaviors to be detected, and the abnormal behavior detection is performed with a granularity of set of behaviors.

In this embodiment, since a system such as Host-based Intrusion Detection System might collect behaviors of multiple sessions on multiple hosts at the same time, the behaviors may be screened based on host identifiers and session identifiers (Session_IDs) and the preset time window, to obtain the set of behaviors to be detected.

S202: labeling each behavior in the set of behaviors to be detected to identify attribute information of each behavior, and acquiring label features of the set of behaviors to be detected according to labels of all behaviors in the set of behaviors to be detected.

In this embodiment, types of different target fields in each behavior in the set of behaviors to be detected may be identified. Every type corresponds to a label. Different target fields include but are not limited to program name field (such as execve field), source IP field, destination IP field, port field, file path field, file name field, etc. As a result, multiple labels may be obtained for each behavior, achieving the characterization of the attribute information of the behavior by multiple labels, and the behavior is converted to be expressed in natural language, enhancing the readability of the behavior data. The labels of all behaviors in the set of behaviors to be detected may characterize this set of behaviors to be detected, and in turn the label features of the set of behaviors to be detected may be constructed based on the labels of all behaviors in the set of behaviors to be detected. For example, the labels of all behaviors in the set of behaviors to be detected may be statistically computed, and based on the statistical results, eigenvectors may be constructed as label features, so as to characterize which labels are included in the labels of all behaviors in the set of behaviors to be detected as well as a number of times for which an included label appears.

S203: mapping, according to a preset embedded feature extracting model, the label features of the set of behaviors to be detected into embedded features.

In this embodiment, considering that although the label features of the set of behaviors to be detected can distinguish abnormal behaviors from normal service behaviors, for certain small amount of normal service behaviors or special operation and maintenance behaviors, the label features thereof may be approximate to those of abnormal behaviors, which will bring some false positives, so further processing on label features is considered in this embodiment.

An embedded feature extracting model may be pre-trained. The embedded feature extracting model can map the label features of any set of behaviors into embedded features. The input of the embedded feature extracting model can be the label features of any set of behaviors, and the output of the embedded feature extracting model can be corresponding embedded features. Optionally, the embedded feature extracting model may be in a form of deep neural network, for example, the embedded feature extracting model may be in a form of an encoder in a Transformer model, or another deep neural network model, which is not limited here. With the embedded feature extracting model, a conversion of high-dimensional label features into dense low-dimensional embedded features can be realized, in which the embedded features, as are fused with abundant valuable information, possess a stronger ability of expression, and can better reflect the characteristics of the corresponding set of behaviors, so as to facilitate the identification of whether there is abnormality in the set of behaviors.

In this embodiment, after being acquired, the label features of the set of behaviors to be detected may be input into the embedded feature extracting model, and then may be processed by the embedded feature extracting model, to obtain the embedded features of the set of behaviors to be detected.

S204: determining, based on the embedded features of the set of behaviors to be detected and embedded features of a pre-acquired set of historical behaviors, whether there is abnormality in the set of behaviors to be detected.

In this embodiment, after acquiring the embedded features of the set of behaviors to be detected, it can be determined, based on the embedded features of the set of behaviors to be detected and the embedded features of the pre-acquired set of historical behaviors, whether there is abnormality in the set of behaviors to be detected, in which the embedded features of the pre-acquired set of historical behaviors are also obtained by the same process as above. Since the category of the set of historical behaviors can be pre-confirmed as, e.g., normal behavior set or abnormal behavior set, whether there is abnormality in the set of behaviors to be detected may be determined on the basis of the embedded features of the set of historical behaviors and by determining a similarity between the embedded features of the set of behaviors to be detected and the embedded features of the pre-acquired set of historical behaviors, or alternatively, whether there is abnormality in the set of behaviors to be detected may also be determined based on the embedded features of the set of behaviors to be detected and the embedded features of the pre-acquired set of historical behaviors and by other methods.

Optionally, after confirming that there is abnormality in the set of behaviors to be detected, an abnormality alarm may be further raised. Upon the alarm, the labels of all behaviors in the set of behaviors to be detected may be presented to assist in determining what operation is performed on the set of behaviors to be detected.

The abnormal behavior detection method of this embodiment includes: collecting a set of behaviors to be detected that belong to a same session within a preset time window; labeling each behavior in the set of behaviors to be detected to identify attribute information of each behavior, and acquiring label features of the set of behaviors to be detected according to labels of all behaviors in the set of behaviors to be detected; mapping, according to a preset embedded feature extracting model, the label features of the set of behaviors to be detected as embedded features; determining, based on the embedded features of the set of behaviors to be detected and embedded features of a pre-acquired set of historical behaviors, whether there is abnormality in the set of behaviors to be detected. This embodiment realizes, by means of labeling, the representation in natural language of respective behaviors in the set of behaviors to be detected, enhancing the readability of behavior data; in turn, quantifies the labels of all behaviors in the set of behaviors to be detected into label features, and then maps them into embedded features, sufficiently describing the features of the set of behaviors to be detected, achieving a strong interpretability; and performs abnormal behavior recognition based on the embedded features, improving the accuracy of recognition and reducing the occurrence of false positives.

On the basis of any of the above embodiments, the labeling each behavior in the set of behaviors to be detected to identify attribute information of each behavior, and acquiring label features of the set of behaviors to be detected according to labels of all behaviors in the set of behaviors to be detected, as described by S202, specifically includes:

S2021: labeling, according to a preset set of labels, a plurality of target fields in each behavior in the set of behaviors to be detected, respectively, to obtain a label corresponding to each behavior;

S2022: acquiring a number of times for which each label in the preset set of labels appears among the labels of respective behaviors in the set of behaviors to be detected;

S2023: constructing, according to the number of times for which each label in the preset set of labels appears, the label features of the set of behaviors to be detected.

In this embodiment, the preset set of labels is a pre-acquired set of labels, which includes alternative labels corresponding to different target fields (which can constitute a label subset). Different target fields include but are not limited to program name field (such as execve field), network-related field such as source IP field, destination IP field, port field, etc., and file-related field such as file path field, file name field, etc. Labels may be added for each target field in each behavior in the set of behaviors to be detected, respectively, so as to obtain a label corresponding to each behavior. A machine learning model (e.g., a neural network model such as a language model) may be employed to realize the annotation of labels. Alternatively, the annotation of labels may also be realized by a matching rule, which may be realized by writing scripts or streaming processing engines (such as Flink). Specifically, according to a preset matching rule, any target field of any behavior may be matched with a label subset corresponding to the target field, to determine the target label corresponding to the target field. Alternatively, some target fields (such as program name fields) are annotated by a machine learning model, and some other target fields are annotated by a matching rule.

As an example, a label subset of program name fields (execve fields) may include but not limited to: file transfer, backup compression, file management, disk management, disk maintenance, system setup, system management, text processing, network communication, device management, e-mail and newsgroups, application programs, package management, other common commands, associated codes, databases, etc. When labeling the program name field (execve field) of any behavior, if the execve field is "find", it is labelled with "file management"; if the execve field is "nginx", it is labelled with "network communication"; if the execve field is "systemd", it is labelled with "system management"; if the execve field is "nginx", it is labelled with "network communication"; if the execve field is "systemd", it is labelled with "system management"; if the execve field is "dpkg", it is labelled with "package management"; if the execve field is "ffmpeg", it is labelled with "application program"; and so on. Optionally, if a file path is included in the program name field (execve field) of any behavior, the prefix path may be extracted.

A label subset of source IP fields may include but not limited to: IPV6 source IP, intranet source IP, loopback source IP, extranet source IP, reserved source IP, etc. When labeling the source IP field of any behavior, if the source IP field is an intranet IP address, it is labelled with "intranet source IP"; if the source IP field is an extranet IP address, it is labelled with "extranet source IP"; if the source IP field is a loopback IP, it is labelled with "loopback source IP"; if the source IP field is a reserved IP address, it is labelled with "reserved source IP"; if the source IP field is an IPV6 address, it is labelled with "IPV6 source IP"; and so on.

A label subset of destination IP fields may include, but is not limited to: IPV6 destination IP, intranet destination IP, loopback destination IP, extranet destination IP, reserved destination IP, etc. When labeling the destination IP field of any behavior, if the destination IP field is an intranet IP address, it is labelled with "intranet destination IP"; if the destination IP field is an extranet IP address, it is labelled with "extranet destination IP"; if the destination IP field is a loopback IP, it is labelled with "loopback destination IP"; if the destination IP field is a reserved IP address, it is labelled with "reserved destination IP"; if the destination IP field is an IPV6 address, it is labelled with "IPV6 destination IP"; and so on.

A label subset of source port fields may include, but is not limited to: well-known source port, registered source port, etc. When labeling the source port field of any behavior, if the source port field is a common well-known port number, it is labelled with "well-known source port"; if the source port field is a registered port number, it is labelled with "registered source port"; and so on.

A label subset of destination port fields may include, but is not limited to: well-known destination ports, registered destination ports, etc. When labeling the destination port field of any behavior, if the destination port field is a common well-known port number, it is labelled with "well-known destination port"; if the destination port field is a registered port number, it is labelled with "registered destination port"; and so on.

A label subset of file path fields may include but not limited to: bin directory, dev directory, etc directory, home directory, lib directory, sbin directory, tmp directory, root directory, mnt directory, lost+found directory, proc directory, var directory, usr directory, opt directory, etc. When labeling the file path field of any behavior, if the path contains a bin directory, it is labelled with "bin directory"; if the path contains a dev directory, it is labelled with "dev directory"; if the path contains an etc directory, it is labelled with "etc directory"; if the path contains a home directory, it is labelled with "home directory"; if the path contains a home directory, it is labelled with "home directory"; if the path contains a lib directory, it is labelled with "lib directory"; if the path contains a sbin directory, it is labelled with "sbin directory"; if the path contains a tmp directory, it is labelled with "tmp directory"; if the path contains a root directory, it is labelled with "root directory"; if the path contains an mnt directory, it is labelled with "mnt directory"; if the path contains a lost+found directory, it is labelled with "lost+found directory"; if the path contains a proc directory, it is labelled with "proc directory"; if the path contains a var directory, it is labelled with "var directory"; if the path contains a usr directory, it is labelled with "usr directory"; if the path contains an opt directory, it is labelled with "opt directory"; and so on.

A label subset of file name fields may include, but is not limited to: log file, py file, sh file, compressed file, web page file, configuration file, etc. When labeling the file name field of any behavior, if the file name contains log, it is labelled with "log file"; if the file name suffix is py, it is labelled with "py file"; if the file name suffix is sh, it is labelled with "sh file"; if the file name suffix is tar or tgz or zip, it is labelled with "compressed file"; if the file name suffix contains php or htm or jsp or do, it is labelled with "web page file"; if the file name contains conf, it is labelled with "configuration file".

The above label setting is an example under Linux operating system, and should be modified accordingly in the case of Windows operating system.

There are many types of label subsets of program name fields, which may be learned based on historical behavior data. The labels corresponding to different program name fields construct the label subset of program name fields, or referred to as label repository as well, which includes a mapping relationship between different program name fields and corresponding labels.

Figure 3:
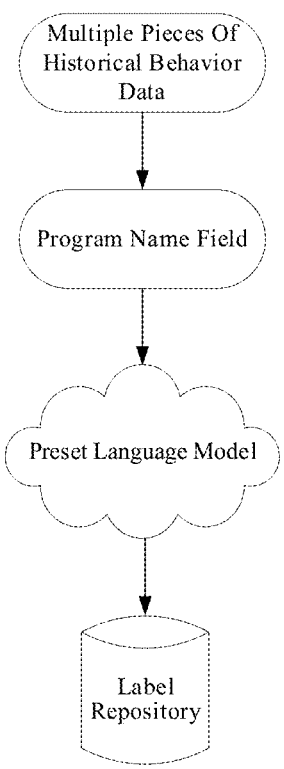
FIG. 3 is a flowchart of an abnormal behavior detection method provided by another embodiment of the present disclosure.

Optionally, as shown in FIG. 3, multiple pieces of historical behavior data may be acquired, and the program name field (execve field) in the historical behavior data may be extracted. If the program name field (execve field) includes a file path, a prefix path may be extracted. The above process of extracting the program name field (execve field) in the historical behavior data may be automatically realized by writing code scripts. The labels corresponding to respective program name fields are acquired with a preset language model, and a label subset (label repository) corresponding to the program name field is constructed. The preset language model can be any language model, such as ChatGPT etc., as long as it performs well in terms of the Q&A in the host security domain. Prompt words may be constructed, and tasks of learning the label subset of program name fields may be distributed to the preset language model through the prompt words. For example, the construction of prompt words are as follows:

"please determine which of the categories in the following category list a Linux command/process 'execve' belongs to: file transfer, backup compression, file management, disk management, disk maintenance, system setup, system management, text processing, network communication, device management, e-mail and newsgroups, application programs, package management, associated codes, databases;

please summarize and give the category of this Linux command if it does not belong to the above categories; or if no answer can be made, the category name is unspecified.

please give a Chinese introduction of this command at the same time, and if the specific situation of this command is unclear, please give a possible speculation and indicate the uncertainty;

please provide an answer in json format, where the 'class' field is command category and the 'description' field is command introduction, and please do not answer with any other information."

Further, the program name fields in the historical behavior data are traversed, the 'execve' in the prompt words is replaced with a specific name of program name field, then the prompt words are input into the preset language model, and the preset language model, based on its own repository, outputs the command category (i.e. label) and detailed information (command introduction) of the program name field, which is stored, optionally, may be stored in a form of Key-Value, where Key is an execve field, so as to facilitate the retrieval. For example:

1. {'class': 'file management', 'description': "A 'find' command is used to search for files and directories under a specified directory. It provides many options to help you specify searching conditions, such as name, size, permission, type, etc. The 'find' command also supports use of regular expressions to match names of files and directories. The 'find' command is very powerful and can help you locate a specific file or directory quickly.", 'execve': 'find'}

2. {'class': 'application program', 'description': "A 'dash' is a Shell program under Unix/Linux operating system and a lightweight version of Bourne shell. It is characterized by fast running speed, less memory occupation and simplified code. The 'dash' is faster in script execution than other Shell such as Bash, so it has certain advantages in terms of startup speed, script execution speed, etc. The 'dash' is usually used as a default/bin/sh interpreter, and in some systems, also used as one of default Shell interpreters for a Linux distribution.", 'execve': 'dash'}

Through the above process, a sufficient utilization of the knowledge of host security domain of expertise implied in the language model can be realized, reducing the cost of manual labeling.

On the basis of the above embodiments, after obtaining the label corresponding to each behavior in the set of behaviors to be detected, a number of times for which each label in the preset set of labels appears among the labels of respective behaviors in the set of behaviors to be detected may be acquired, and the number of times is denoted as 0 if there is no appearance. Further, the label features of the set of behaviors to be detected may be constructed based on the number of times for which each label in the preset set of labels appears. For example, the number of times for which each label in the preset set of labels appears may be directly ranked in a preset label order, to obtain a first sequence (array), which is directly taken as the label features of the set of behaviors to be detected.

In order to facilitate the processing by the embedded feature extracting model, the number of times for which each label appears may be quantified, that is, discretized, in which the numerical values for the numbers of times are mapped into specific numerical values through a preset mapping relationship. For example, the preset mapping relationship may be as follows:

| Number Of Label Appearances | Quantified Numerical Value |
|---|---|
| 0 | 0 |
| >=1, <10 | 1 |
| >=10, <100 | 2 |
| >=100, <1000 | 3 |
| >=1000, <10000 | 4 |
| >=10000 | 5 |

Based on the preset mapping relationship, each numerical value in the first sequence may be mapped, to obtain a second sequence, which may be taken as the label features of the set of behaviors to be detected.

By way of example, taking the preset set of labels in the above examples as an example, it includes 50 types of labels, each label corresponds to a position, denoting a number of times for which the label appears among the labels of respective behaviors in the set of behaviors to be detected, and is a 50-bit all-zero array at initialization. Assuming that among the labels of respective behaviors in the set of behaviors to be detected, the label of "file transfer" appears for 120 times, the label of "internal network source IP" appears for 10 times and the label of "extranet destination IP" appears for 10 times, a second sequence is obtained accordingly, which is taken as the label features (i.e. eigenvectors) of the set of behaviors to be detected. The numbers of appearances among the labels of respective behaviors are as follows:

[3, 0, 0, 0, 0, 0, 0, 0, 0, 0, 0, 0, 0, 0, 0, 0, 2, 0, 0, 0, 0, 0, 0, 2, 0, 0, 0, 0, 0, 0, 0, 0, 0, 0, 0, 0, 0, 0, 0, 0,0, 0, 0, 0, 0, 0, 0, 0].

Through the above quantification process, the labels of respective behaviors in the set of behaviors to be detected can be quantified reasonably and efficiently.

Figure 4:
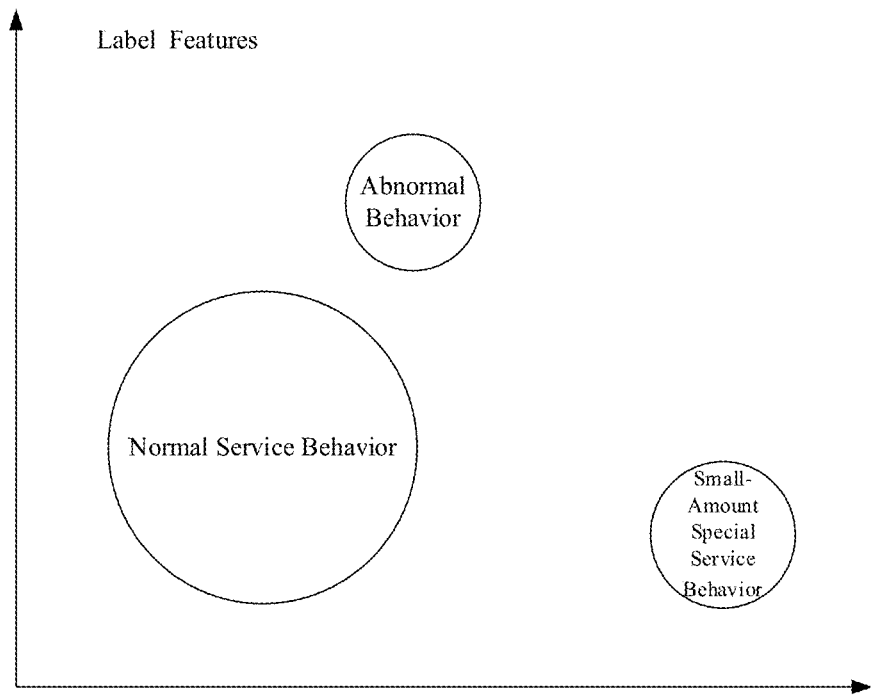
FIG. 4 is a diagram of a label feature distance provided by an embodiment of the present disclosure.

Further, considering that although the label features of the set of behaviors to be detected can distinguish abnormal behaviors from normal service behaviors, for certain small amount of special service behaviors or special operation and maintenance behaviors, the label features thereof may be approximate to those of abnormal behaviors, which will bring some false positives. That is, in the feature space of label features, the label features of certain small-amount special service behaviors/special operation and maintenance behaviors have larger distances from the label features of the normal service behaviors than distances of the label features of the abnormal behaviors from the label features of the normal service behaviors, as shown in FIG. 4. By way of example:

The numbers of appearances (first sequence) of respective behaviors in a certain set of mining behaviors (abnormal behavior) are as follows:
[1,0,169,1,0,99,334,666,26,0,0,1,0,0,0,0,0,1,0,0,0,0,0,0,
1,0,1,0,0,0,0,0,0,0,0,0,1,0,0,0,0,4 9,0,0,1,0,0,0,0,0];
the quantified label features are as follows:
[1,0,3,1,0,2,3,3,2,0,0,1,0,0,0,0,0,1,0,0,0,0,0,0,1,0,1,0,0,0,
0,0,0,0,0,0,1,0,0,0,0,2,0,0,1,0,0, 0,0,0];
and the label features of another set of small-amount normal service behaviors or special operation and maintenance behaviors are:
[0,0,3,2,0,1,3,3,2,0,0,0,0,0,0,0,1,0,0,0,0,1,0,0,0,1,0,0,0,
0,0,0,0,0,0,3,0,0,0,0,3,0,0,1,0,0, 0,0,0];
which, apparently, are similar to the label features of the set of mining behaviors. In order to significantly distinguish the label features of these two behavior sets, it is required to give some specific labels a greater weight. For example, the set of mining behaviors generally involves file transfer, so the label bits for file transfer are configured with a greater weight, and other different label bits may be configured with different weights. It is difficult to adapt to all situations by manually setting weight sizes for different label bits, whereas dynamically adjusting features' weights through a model is more appropriate.

In order to achieve the above goal, an extraction of embedded features may be performed and an embedded feature extracting model may be trained.

Figure 5:
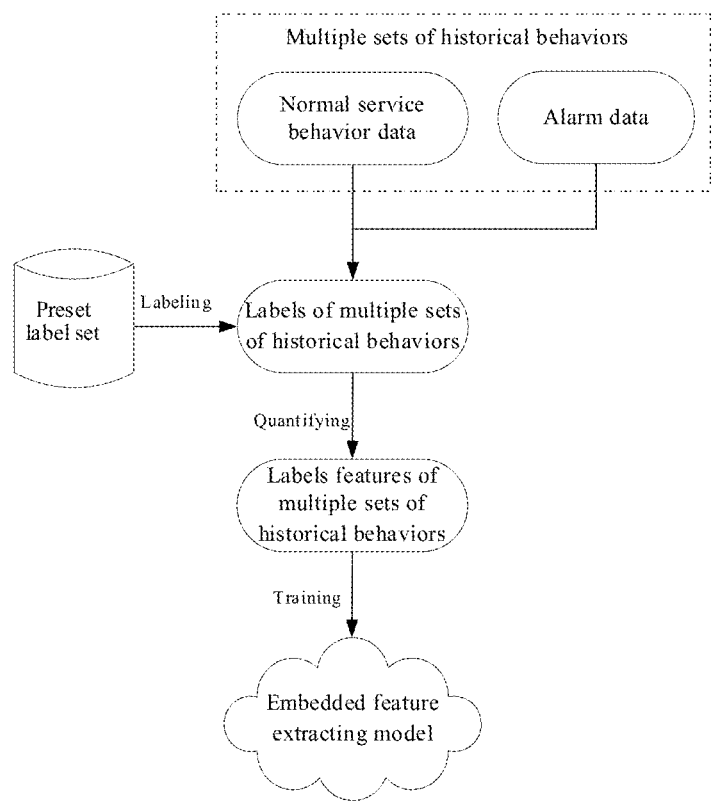
FIG. 5 is a flowchart of an abnormal behavior detection method provided by yet another embodiment of the present disclosure.

Specifically, as shown in FIG. 5, a plurality of different types of sets of historical behaviors may be acquired, such as HIDS alarm data in real services (including real red-blue confrontation data) collected by a same Host-based Intrusion Detection System, HIDS alarm data on honeypots (including various behaviors such as mining, Trojan backdoor, etc.), normal service behavior data, etc. The above data are all divided into the granularity of set of behaviors. That is, the behavior data within a preset time window (such as 60 minutes) is selected from the behavior data in the same session on the same host, to obtain the plurality of sets of historical behaviors. The alarm type is taken as the category of HIDS alarm data, and the specific service name is taken as the category of real service behavior data. In turn, the method in the above embodiments is employed on the plurality of different types of sets of historical behaviors, to acquire the label features of each set of historical behaviors, and the label features of the plurality of sets of historical behaviors are taken as the training data. Further, the training of the embedded feature extracting model is performed based on the training data.

Figure 6:
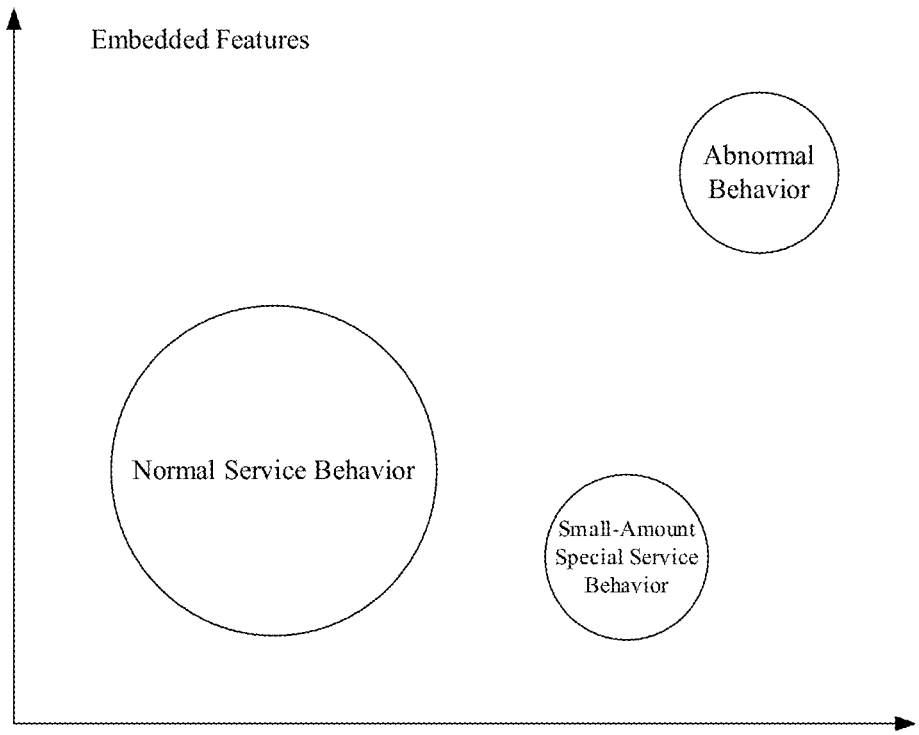
FIG. 6 is a diagram of an embedded feature distance provided by an embodiment of the present disclosure.

An initial embedded feature extracting model may be constructed first. The embedded feature extracting model may employ the encoder in the Transformer model (of course, other deep neural networks may also be employed) to map the label features of the respective training data into embedded features. According to the embedded features corresponding to the respective training data and a triplet loss function, the embedded feature extracting model is back-propagated, and the model parameters of the embedded feature extracting model are adjusted, in which by means of the triplet loss, the embedded features of the same type of training data are made to be similar, and the embedded features of the normal service behaviors and the abnormal behaviors are made to be quite different. The triplet loss function is expressed as:

$$L = \max(d(a, p) - d(a, n) + \text{margin}, 0)$$

where d is a distance metric function, generally a cosine distance or an Euclidean distance; a is an anchor point, that is, a current sample selected from a training data set every time; p is a sample with the same category as the anchor point sample; n is a sample with a different category from the anchor point sample; and margin is a hyper-parameter set manually, with a default size of 1. A goal of minimizing L will cause the feature distance $d(a,p)$ between a and p to be close to 0, and the feature distance $d(a, n)$ between a and n to be greater than $d(a,p)$+margin. After being trained with such scheme, the deep neural network can convert the label features into the embedded features. In the feature space of embedded features, the feature distances of certain small-amount special service behaviors/special operation and maintenance behaviors from the normal service behaviors are smaller than those of the abnormal behaviors from the normal service behaviors, as shown in FIG. 6, so that abnormal behaviors can be distinguished.

In this embodiment, after being acquired, the label features of the set of behaviors to be detected may be input into the embedded feature extracting model, and then may be processed by the embedded feature extracting model, to obtain the embedded features of the set of behaviors to be detected. For example, the label features:
[1,0,3,1,0,2,3,3,2,0,0,1,0,0,0,0,0,1,0,0,0,0,0,0,1,0,1,0,0,0,
0,0,0,0,0,0,1,0,0,0,0,2,0,0,1,0,0, 0,0,0];
The embedded features obtained by processing by the embedded feature extracting model are:
[0.68, 0, 0.012, 0.24 . . . ]

In an alternative embodiment, the determining, based on the embedded features of the set of behaviors to be detected and embedded features of a pre-acquired set of historical behaviors, whether there is abnormality in the set of behaviors to be detected, as described by S204, specifically includes:

employing, with respect to the embedded features of the set of behaviors to be detected, a preset clustering model to perform incremental clustering on the basis of a clustering result for the embedded features of the set of historical behaviors; in which the clustering result for the embedded features of the set of historical behaviors includes a normal behavior category and an abnormal behavior category, and a number of samples in the abnormal behavior category is smaller than a preset threshold number of samples;

determining that there is abnormality in the set of behaviors to be detected, if the embedded features of the set of behaviors to be detected are added to the abnormal behavior category, or the embedded features of the set of behaviors to be detected do not belong to any of the categories.

In this embodiment, a plurality of sets of historical behaviors may be pre-collected. For example, a plurality of sets of historical behaviors within a predetermined time duration in the past may be collected (the predetermined time duration may be determined according to data volume and resource situation, for example, may be selected as 1-7 days, etc.), and the embedded features of each set of historical behaviors may be acquired respectively by employing the method in the above embodiments. The clustering may be performed according to the embedded features of the respective sets of historical behaviors. For example, a singlepass clustering algorithm or a DBSCAN clustering algorithm or the like may be employed to perform clustering on the embedded features of the respective sets of historical behaviors, and the clustering results are taken as basic categories, in which among the clustering results, a category with a number of samples smaller than a preset threshold number of samples is taken as an abnormal behavior category, and a category with a number of samples not smaller than the preset threshold number of samples is taken as a normal behavior category. After acquiring the embedded features of the set of behaviors to be detected, incremental clustering may be performed on the basis of the clustering results of the embedded features of the set of historical behaviors. That is, the same clustering algorithm is continued to be employed to determine whether the embedded features of the set of behaviors to be detected can be classified into any category of the above clustering results. If the embedded features of the set of behaviors to be detected are classified into the abnormal behavior category, or the embedded features of the set of behaviors to be detected do not belong to any category, it is determined that there is abnormality in the set of behaviors to be detected.

In another alternative embodiment, the determining, based on the embedded features of the set of behaviors to be detected and embedded features of a pre-acquired set of historical behaviors, whether there is abnormality in the set of behaviors to be detected, as described by S204, specifically includes:

employing an AutoEncoder model to encode and decode the embedded features of the set of behaviors to be detected, to obtain an output result, in which the AutoEncoder model is obtained by training on the embedded features of the set of historical behaviors;

determining, according to an error between the output result and the embedded features of the set of behaviors to be detected, whether there is abnormality in the set of behaviors to be detected.

In this embodiment, the AutoEncoder model is an unsupervised neural network model, which can learn implicit features of input data, which is referred to as encoding, and meanwhile, the original input data can be reconstructed by using the learned new features, which is referred to as decoding.

In this embodiment, a plurality of sets of historical behaviors may be pre-collected. For example, a plurality of sets of historical behaviors within a predetermined time duration in the past may be collected (the predetermined time duration may be determined according to data volume and resource situation, for example, may be selected as 1-7 days, etc.), and the embedded features of each set of historical behaviors may be acquired respectively by employing the method in the above embodiments. The AutoEncoder model is then trained based on the embedded features of the plurality of sets of historical behaviors. Since the number of sets of normal behaviors is larger than that of sets of abnormal behaviors, that is, among the embedded features of the plurality of sets of historical behaviors, the number of the embedded features of the sets of normal behaviors is more than that of the sets of abnormal behavior, the AutoEncoder model is sufficiently trained in terms of normal behavior during training, and the difference between the output results and the embedded features of the input sets of normal behaviors is small. However, since the number of the embedded features of the sets of abnormal behaviors is small, the AutoEncoder model has not been sufficiently trained in terms of abnormal behavior, and the difference between the output results and the embedded features of the input sets of abnormal behaviors is great.

After being acquired, the embedded features of the set of behaviors to be detected are input into the trained AutoEncoder model for encoding and decoding. If an error between the output results and the embedded features of the set of behaviors to be detected is small and does not exceed a preset error threshold, the set of behaviors to be detected can be determined as a set of normal behaviors. If the error between the output results and the embedded features of the set of behaviors to be detected is large and exceeds the preset error threshold, the set of behaviors to be detected can be determined as a set of abnormal behaviors.

In another alternative embodiment, the embedded features of the set of historical behaviors include embedded features of at least one set of historical abnormal behaviors, in which the set of historical abnormal behaviors can either be a set of abnormal behaviors (such as intrusion behavior or other malicious behaviors) that has been manually confirmed, or a set of abnormal behaviors determined through other methods, and the embedded features of the set of historical abnormal behaviors can be used as index items; accordingly, the determining, based on the embedded features of the set of behaviors to be detected and embedded features of a pre-acquired set of historical behaviors, whether there is abnormality in the set of behaviors to be detected, as described by S204, specifically includes:

acquiring a similarity between the embedded features of the set of behaviors to be detected and the embedded features of the set of historical abnormal behaviors;

determining, according to the similarity, whether there is abnormality in the set of behaviors to be detected.

In this embodiment, a similarity between the embedded features of the set of behaviors to be detected and the embedded features of the set of historical abnormal behaviors may be calculated. If the similarity exceeds a preset similarity threshold, it means that the similarity between the set of behaviors to be detected and the set of historical abnormal behaviors is very high, and it can be confirmed that there is abnormality in the set of behaviors to be detected, and an alarm can be raised, in which the information related to the set of historical abnormal behaviors may also be given during the alarm. In this embodiment, if there are embedded features of a plurality of sets of historical abnormal behaviors, and the embedded features of the sets of historical abnormal behaviors are taken as index items, based on the index items, the similarity between the embedded features of the set of behaviors to be detected and the embedded features of the respective sets of historical abnormal behaviors may be calculated respectively, and it may be determined whether the maximum similarity exceeds the preset similarity threshold. Optionally, the above process can be realized by employing a streaming processing engine (such as Flink). If the set of abnormal behaviors is a set of malicious behaviors (e.g., a set of intrusion behaviors or another set of malicious behaviors), the method of this embodiment can realize the determination of whether the set of behaviors to be detected is a set of malicious behaviors.

In addition, a set of historical behaviors in a past period of time may be traced back, and the similarity between the embedded features of the set of historical behaviors and the embedded features of the set of historical abnormal behaviors may be calculated, thereby achieving threat hunting, to determine whether a behavior with a high similarity to the set of historical abnormal behaviors has occurred in the past period of time.

It should be noted that the above various optional embodiments can also be combined without conflict, and the determination results of various embodiments can be fused to eventually confirm whether there is abnormality in the set of behaviors to be detected, thereby improving the accuracy and avoiding false positives.

Figure 7:
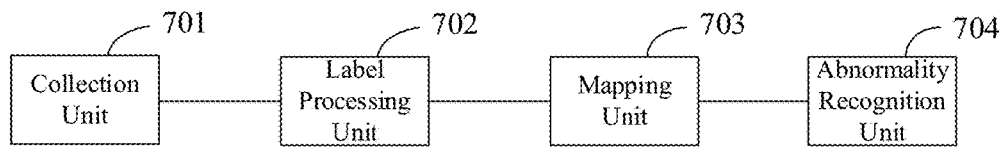
FIG. 7 is a structural block diagram of an abnormal behavior detection device provided by an embodiment of the present disclosure.

Corresponding to the abnormal behavior detection method of the embodiments in the above, FIG. 7 is a structural block diagram of an abnormal behavior detection device provided by an embodiment of the present disclosure. For convenience of illustration, only the parts related to the embodiments of the present disclosure are shown. Referring to FIG. 7, the abnormal behavior detection device 700 includes a collection unit 701, a label processing unit 702, a mapping unit 703 and an abnormality recognition unit 704.

The collection unit 701 is configured to collect a set of behaviors to be detected that belong to a same session within a preset time window;
  the label processing unit 702 is configured to label each behavior in the set of behaviors to be detected to identify attribute information of each behavior, and acquire label features of the set of behaviors to be detected according to labels of all behaviors in the set of behaviors to be detected;
  the mapping unit 703 is configured to map, according to a preset embedded feature extracting model, the label features of the set of behaviors to be detected into embedded features;
  the abnormality recognition unit 704 is configured to determine, based on the embedded features of the set of behaviors to be detected and embedded features of a pre-acquired set of historical behaviors, whether there is abnormality in the set of behaviors to be detected.

In one or more embodiments of the present disclosure, the label processing unit 702, when labeling each behavior in the set of behaviors to be detected to identify attribute information of each behavior, and acquiring label features of the set of behaviors to be detected according to labels of all behaviors in the set of behaviors to be detected, is configured to:
  label, according to a preset set of labels, a plurality of target fields in each behavior in the set of behaviors to be detected, respectively, to obtain a label corresponding to each behavior;
  acquire a number of times for which each label in the preset set of labels appears among the labels of respective behaviors in the set of behaviors to be detected;
  construct, according to the number of times for which each label in the preset set of labels appears, the label features of the set of behaviors to be detected.

In one or more embodiments of the present disclosure, the label processing unit 702, when constructing, according to the number of times for which each label in the preset set of labels appears, the label features of the set of behaviors to be detected, is configured to:
  rank, in a preset label order, the number of times for which each label in the preset set of labels appears, to obtain a first sequence;
  map, according to a preset mapping relationship, each numerical value in the first sequence, to obtain a second sequence as the label features of the set of behaviors to be detected.

In one or more embodiments of the present disclosure, the abnormality recognition unit 704, when determining, based on the embedded features of the set of behaviors to be detected and embedded features of a pre-acquired set of historical behaviors, whether there is abnormality in the set of behaviors to be detected, is configured to:
  employ, with respect to the embedded features of the set of behaviors to be detected, a preset clustering model to perform incremental clustering on the basis of a clustering result for the embedded features of the set of historical behaviors; in which the clustering result for the embedded features of the set of historical behaviors includes a normal behavior category and an abnormal behavior category, and a number of samples in the abnormal behavior category is smaller than a preset threshold number of samples;
  determine that there is abnormality in the set of behaviors to be detected, if the embedded features of the set of behaviors to be detected are added to the abnormal behavior category, or the embedded features of the set of behaviors to be detected do not belong to any of the categories.

In one or more embodiments of the present disclosure, the abnormality recognition unit 704, when determining, based on the embedded features of the set of behaviors to be detected and embedded features of a pre-acquired set of historical behaviors, whether there is abnormality in the set of behaviors to be detected, is configured to:
  employ an AutoEncoder model to encode and decode the embedded features of the set of behaviors to be detected, to obtain an output result, in which the AutoEncoder model is obtained by training on the embedded features of the set of historical behaviors;
  determine, according to an error between the output result and the embedded features of the set of behaviors to be detected, whether there is abnormality in the set of behaviors to be detected.

In one or more embodiments of the present disclosure, the embedded features of the set of historical behaviors includes embedded features of at least one set of historical abnormal behaviors; the abnormality recognition unit 704, when determining, based on the embedded features of the set of behaviors to be detected and embedded features of a pre-acquired set of historical behaviors, whether there is abnormality in the set of behaviors to be detected, is configured to:
  acquire a similarity between the embedded features of the set of behaviors to be detected and the embedded features of the set of historical abnormal behaviors;
  determine, according to the similarity, whether there is abnormality in the set of behaviors to be detected.

In one or more embodiments of the present disclosure, the preset set of labels includes label subsets corresponding to different target fields; correspondingly, the label processing unit 702, when labeling, according to a preset set of labels, a plurality of target fields in each behavior in the set of behaviors to be detected, respectively, is configured to:
  match, according to a preset matching rule, any target field of any behavior with a label subset corresponding to the target field, and determine a target label corresponding to the target field.

In one or more embodiments of the present disclosure, the target field includes one or more of: a program name field, a source IP field, a destination IP field, a port field, a file path field and a file name field.

In one or more embodiments of the present disclosure, the label processing unit 702 is further configured to:

acquire a plurality of pieces of historical behavior data, and extract program name fields in the historical behavior data;

employ a preset language model to acquire labels corresponding to respective program name fields, and construct a label subset corresponding to the program name fields.

In one or more embodiments of the present disclosure, the embedded feature extracting model is obtained by a process of training as follows:

acquiring a plurality of sets of historical behaviors of different categories, acquiring label features of each set of historical behaviors, and taking the label features of the plurality of sets of historical behaviors as training data;

inputting the training data to the embedded feature extracting model, acquiring embedded features corresponding to the respective training data, back-propagating the embedded feature extracting model according to the embedded features corresponding to the respective training data and a triplet loss function, and adjusting model parameters of the embedded feature extracting model, to eventually obtain the trained embedded feature extracting model.

In one or more embodiments of the present disclosure, the embedded feature extracting model employs an encoder in a Transformer model.

The abnormal behavior detection device provided by this embodiment can be used to perform the technical schemes of the above method embodiments, whose implementation principles and technical effects are similar, and will no more be detailed here in this embodiment.

Figure 8:
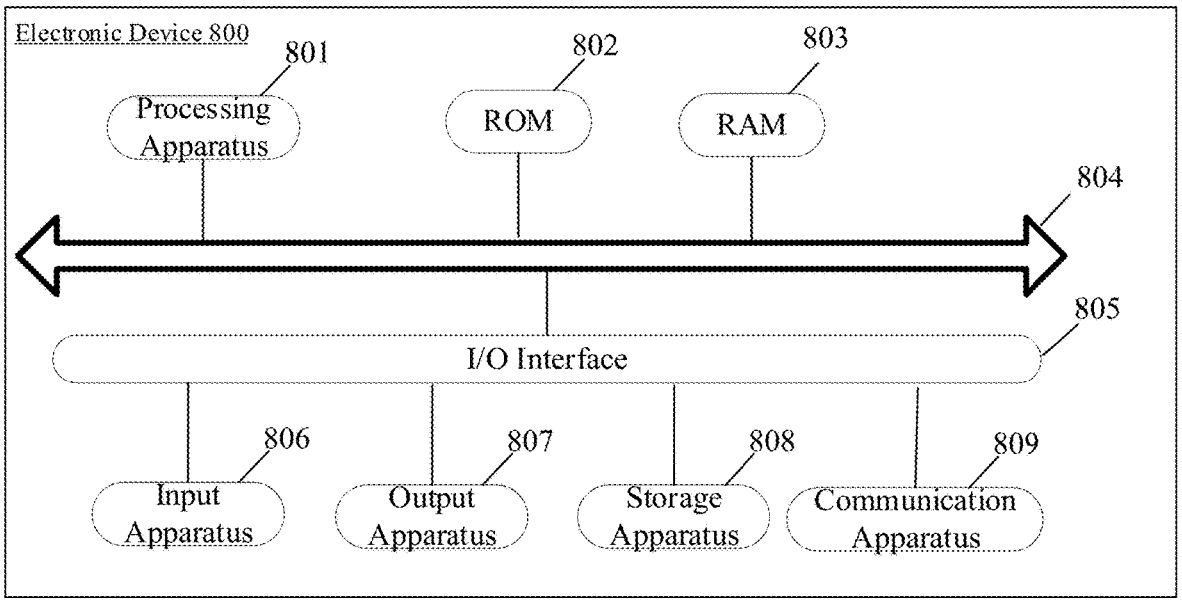
FIG. 8 is a hardware structural diagram of an electronic device provided by an embodiment of the present disclosure.

Referring to FIG. 8, FIG. 8 illustrates a structural diagram of an electronic device 800 suitable for implementing the embodiments of the present disclosure, which may be a terminal device or a server. The terminal device may include, but is not limited to, mobile terminal such as mobile phone, notebook computer, digital broadcast receiver, Personal Digital Assistant (PDA), Portable Android Device (PAD), Portable Multimedia Player (PMP), vehicle-mounted terminal (e.g., vehicle-mounted navigation terminal), etc., as well as stationary terminal such as digital TV, desktop computer, etc. The electronic device shown in FIG. 8 is merely an example, and should not bring any limitation to the function and application scope of the embodiments of the present disclosure.

As shown in FIG. 8, the electronic device 800 may include a processing apparatus (e.g., a central processing unit, a graphics processing unit, etc.) 801, which may perform various appropriate actions and processes according to a program stored in a Read Only Memory (ROM) 802 or a program loaded from a storage apparatus 808 into a Random Access Memory (RAM) 803. The RAM 803 further stores various programs and data required for the operations of the electronic device 800. The processing apparatus 801, the ROM 802 and the RAM 803 are connected to each other through a bus 804. An input/output (I/O) interface 805 is also connected to the bus 804.

Usually, the following apparatus may be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a loudspeaker, a vibrator, or the like; a storage apparatus 808 including, for example, a magnetic tape, a hard disk, or the like; and a communication apparatus 809. The communication apparatus 809 may allow the electronic device 800 to be in wireless or wired communication with other devices to exchange data. While FIG. 8 illustrates the electronic device 800 having various apparatuses, it should be understood that not all of the illustrated apparatuses are necessarily implemented or included. More or fewer apparatuses may be implemented or included alternatively.

Particularly, according to embodiments of the present disclosure, the processes described above with reference to the flowcharts may be implemented as a computer software program. For example, embodiments of the present disclosure include a computer program product, which includes a computer program carried by a computer-readable medium. The computer program includes program codes for performing the methods shown in the flowcharts. In such embodiments, the computer program may be downloaded online through the communication apparatus 809 and installed, or may be installed from the storage apparatus 808, or may be installed from the ROM 802. When the computer program is executed by the processing apparatus 801, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to perform the methods in the above embodiments.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation of the unit itself under certain circumstances. For example, a first acquisition unit can also be described as a unit acquiring at least two Internet Protocol addresses.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In an aspect, according to one or more embodiments of the present disclosure, there is provided an abnormal behavior detection method, comprising:

collecting a set of behaviors to be detected that belong to a same session within a preset time window;

labeling each behavior in the set of behaviors to be detected to identify attribute information of each behavior, and acquiring label features of the set of behaviors to be detected according to labels of all behaviors in the set of behaviors to be detected;

mapping, according to a preset embedded feature extracting model, the label features of the set of behaviors to be detected into embedded features; and determining, based on the embedded features of the set of behaviors to be detected and embedded features of a pre-acquired set of historical behaviors, whether there is abnormality in the set of behaviors to be detected.

According to one or more embodiments of the present disclosure, according to one or more embodiments of the present disclosure, the labeling each behavior in the set of behaviors to be detected to identify the attribute information of each behavior, and acquiring the label features of the set of behaviors to be detected according to the labels of all behaviors in the set of behaviors to be detected, comprises:

labeling, according to a preset set of labels, a plurality of target fields in each behavior in the set of behaviors to be detected respectively, to obtain a label corresponding to each behavior;

acquiring a number of times for which each label in the preset set of labels appears among the labels of respective behaviors in the set of behaviors to be detected; and constructing, according to the number of times for which each label in the preset set of labels appears, the label features of the set of behaviors to be detected.

According to one or more embodiments of the present disclosure, the constructing, according to the number of times for which each label in the preset set of labels appears, the label features of the set of behaviors to be detected, comprises:

ranking, in a preset label order, the number of times for which each label in the preset set of labels appears, to obtain a first sequence; and mapping, according to a preset mapping relationship, each numerical value in the first sequence, to obtain a second sequence as the label features of the set of behaviors to be detected.

According to one or more embodiments of the present disclosure, the determining, based on the embedded features of the set of behaviors to be detected and the embedded features of the pre-acquired set of historical behaviors, whether there is abnormality in the set of behaviors to be detected, comprises:

employing, with respect to the embedded features of the set of behaviors to be detected, a preset clustering model to perform incremental clustering on the basis of a clustering result for the embedded features of the set of historical behaviors, wherein the clustering result for the embedded features of the set of historical behaviors includes a normal behavior category and an abnormal behavior category, and a number of samples in the abnormal behavior category is smaller than a preset threshold number of samples; and determining that there is abnormality in the set of behaviors to be detected, if the embedded features of the set of behaviors to be detected are added to the abnormal behavior category, or the embedded features of the set of behaviors to be detected do not belong to any of the categories.

According to one or more embodiments of the present disclosure, the determining, based on the embedded features of the set of behaviors to be detected and the embedded features of the pre-acquired set of historical behaviors, whether there is abnormality in the set of behaviors to be detected, comprises:

employing an AutoEncoder model to encode and decode the embedded features of the set of behaviors to be detected, to obtain an output result, wherein the AutoEncoder model is obtained by training on the embedded features of the set of historical behaviors; and determining, according to an error between the output result and the embedded features of the set of behaviors to be detected, whether there is abnormality in the set of behaviors to be detected.

According to one or more embodiments of the present disclosure, the embedded features of the set of historical behaviors includes embedded features of at least one set of historical abnormal behaviors; the determining, based on the embedded features of the set of behaviors to be detected and the embedded features of the pre-acquired set of historical behaviors, whether there is abnormality in the set of behaviors to be detected, comprises:

acquiring a similarity between the embedded features of the set of behaviors to be detected and the embedded features of the set of historical abnormal behaviors; and determining, according to the similarity, whether there is abnormality in the set of behaviors to be detected.

According to one or more embodiments of the present disclosure, the preset set of labels includes label subsets corresponding to different target fields; correspondingly, the labeling, according to the preset set of labels, a plurality of target fields in each behavior in the set of behaviors to be detected respectively, comprises:

matching, according to a preset matching rule, any target field of any behavior with a label subset corresponding to the target field, and determining a target label corresponding to the target field.

According to one or more embodiments of the present disclosure, the target field includes one or more of: a program name field, a source IP field, a destination IP field, a port field, a file path field and a file name field.

According to one or more embodiments of the present disclosure, the method further comprises:

acquiring a plurality of pieces of historical behavior data, and extracting program name fields in the historical behavior data; and employing a preset language model to acquire labels corresponding to respective program name fields, and constructing a label subset corresponding to the program name fields.

According to one or more embodiments of the present disclosure, the embedded feature extracting model is obtained through training by a process of:

acquiring a plurality of sets of historical behaviors of different categories, acquiring label features of each set of historical behaviors, and taking label features of the plurality of sets of historical behaviors as training data; and inputting the training data into the embedded feature extracting model, acquiring embedded features corresponding to the respective training data, back-propagating the embedded feature extracting model according to the embedded features corresponding to the respective training data and a triplet loss function, and adjusting model parameters of the embedded feature extracting model, to eventually obtain a trained embedded feature extracting model.

According to one or more embodiments of the present disclosure, the embedded feature extracting model employs an encoder in a Transformer model.

In an aspect, according to one or more embodiments of the present disclosure, there is provided an abnormal behavior detection device, comprising:

a collection unit, configured to collect a set of behaviors to be detected that belong to a same session within a preset time window;

a label processing unit, configured to label each behavior in the set of behaviors to be detected to identify attribute information of each behavior, and acquire label features of the set of behaviors to be detected according to labels of all behaviors in the set of behaviors to be detected;

a mapping unit, configured to map, according to a preset embedded feature extracting model, the label features of the set of behaviors to be detected into embedded features; and an abnormality recognition unit, configured to determine, based on the embedded features of the set of behaviors to be detected and embedded features of a pre-acquired set of historical behaviors, whether there is abnormality in the set of behaviors to be detected.

According to one or more embodiments of the present disclosure, in the labeling each behavior in the set of behaviors to be detected to identify the attribute information of each behavior, and acquiring the label features of the set of behaviors to be detected according to the labels of all behaviors in the set of behaviors to be detected, the label processing unit is configured to:

label, according to a preset set of labels, a plurality of target fields in each behavior in the set of behaviors to be detected respectively, to obtain a label corresponding to each behavior;

acquire a number of times for which each label in the preset set of labels appears among the labels of respective behaviors in the set of behaviors to be detected; and construct, according to the number of times for which each label in the preset set of labels appears, the label features of the set of behaviors to be detected.

According to one or more embodiments of the present disclosure, in the constructing, according to the number of times for which each label in the preset set of labels appears, the label features of the set of behaviors to be detected, the label processing unit is configured to:

rank, in a preset label order, the number of times for which each label in the preset set of labels appears, to obtain a first sequence; and map, according to a preset mapping relationship, each numerical value in the first sequence, to obtain a second sequence as the label features of the set of behaviors to be detected.

According to one or more embodiments of the present disclosure, in the determining, based on the embedded features of the set of behaviors to be detected and the embedded features of the pre-acquired set of historical behaviors, whether there is abnormality in the set of behaviors to be detected, the abnormality recognition unit is configured to:

employ, with respect to the embedded features of the set of behaviors to be detected, a preset clustering model to perform incremental clustering on the basis of a clustering result for the embedded features of the set of historical behaviors, wherein the clustering result for the embedded features of the set of historical behaviors includes a normal behavior category and an abnormal behavior category, and a number of samples in the abnormal behavior category is smaller than a preset threshold number of samples; and determine that there is abnormality in the set of behaviors to be detected, if the embedded features of the set of behaviors to be detected are added to the abnormal behavior category, or the embedded features of the set of behaviors to be detected do not belong to any of the categories.

According to one or more embodiments of the present disclosure, in the determining, based on the embedded features of the set of behaviors to be detected and the embedded features of the pre-acquired set of historical behaviors, whether there is abnormality in the set of behaviors to be detected, the abnormality recognition unit is configured to:

employ an AutoEncoder model to encode and decode the embedded features of the set of behaviors to be detected, to obtain an output result, wherein the AutoEncoder model is obtained by training on the embedded features of the set of historical behaviors; and determine, according to an error between the output result and the embedded features of the set of behaviors to be detected, whether there is abnormality in the set of behaviors to be detected.

According to one or more embodiments of the present disclosure, the embedded features of the set of historical behaviors includes embedded features of at least one set of historical abnormal behaviors; in the determining, based on the embedded features of the set of behaviors to be detected and the embedded features of the pre-acquired set of historical behaviors, whether there is abnormality in the set of behaviors to be detected, the abnormality recognition unit is configured to:

acquire a similarity between the embedded features of the set of behaviors to be detected and the embedded features of the set of historical abnormal behaviors; and determine, according to the similarity, whether there is abnormality in the set of behaviors to be detected.

According to one or more embodiments of the present disclosure, the preset set of labels includes label subsets corresponding to different target fields; correspondingly, in the labeling, according to the preset set of labels, a plurality of target fields in each behavior in the set of behaviors to be detected respectively, the label processing unit is configured to:

match, according to a preset matching rule, any target field of any behavior with a label subset corresponding to the target field, and determining a target label corresponding to the target field.

According to one or more embodiments of the present disclosure, the target field includes one or more of: a program name field, a source IP field, a destination IP field, a port field, a file path field and a file name field.

According to one or more embodiments of the present disclosure, the label processing unit is further configured to:

acquire a plurality of pieces of historical behavior data, and extracting program name fields in the historical behavior data; and employ a preset language model to acquire labels corresponding to respective program name fields, and constructing a label subset corresponding to the program name fields.

According to one or more embodiments of the present disclosure, the embedded feature extracting model is obtained through training by a process of:

acquiring a plurality of sets of historical behaviors of different categories, acquiring label features of each set of historical behaviors, and taking label features of the plurality of sets of historical behaviors as training data; and inputting the training data into the embedded feature extracting model, acquiring embedded features corresponding to the respective training data, back-propagating the embedded feature extracting model according to the embedded features corresponding to the respective training data and a triplet loss function, and adjusting model parameters of the embedded feature extracting model, to eventually obtain a trained embedded feature extracting model.

According to one or more embodiments of the present disclosure, the embedded feature extracting model employs an encoder in a Transformer model.

In an aspect, according to one or more embodiments of the present disclosure, there is provided an electronic device, comprising: at least one processor and a memory;

the memory stores computer-executable instructions;

the at least one processor executes the computer-executable instructions stored in the memory, so that the at least one processor performs the abnormal behavior detection method of the aspects and various possible designs of the aspects.

In an aspect, according to one or more embodiments of the present disclosure, there is provided a computer-readable storage medium, having stored therein computer-executable instructions which, when executed by a processor, implement the abnormal behavior detection method of the aspects and various possible designs of the aspects.

In an aspect, according to one or more embodiments of the present disclosure, there is provided a computer program product, comprising computer-executable instructions which, when executed by a processor, implement the abnormal behavior detection method of the aspects and various possible designs of the aspects.

The above description is only the preferred embodiments of the present disclosure and the illustration of the applied technical principles. It should be understood by those skilled in the art that the disclosed scope involved in the present disclosure is not limited to the technical schemes formed by specific combinations of the above technical features, but also should encompass the other technical schemes formed by any combination of the above technical features or their equivalent features without departing from the above disclosed concept, e.g., the other technical schemes formed by mutual substitution of the above features and the technical features with similar functions (but not limited thereto) disclosed in the present disclosure.

Furthermore, while various operations are depicted in a particular order, this should not be understood as requiring that such operations be performed in the particular order shown or in a sequential order. Under certain circumstances, multitasking and parallel processing may be beneficial. Likewise, while several specific implementation details are contained in the above discussion, these should not be construed as limiting the scope of the present disclosure. Certain features described in the context of separate embodiments can also be implemented in combination in a single embodiment. On the contrary, various features described in the context of a single embodiment can also be implemented in multiple embodiments individually or in any suitable sub-combination.

Although the present subject matter has been described in language specific to structural features and/or methodological logical actions, it should be understood that the subject matter defined in the appended claims is not necessarily limited to the specific features or actions described above. On the contrary, the specific features and actions described above are merely exemplary forms of implementing the claims.

The invention claimed is:

1. An abnormal behavior detection method, comprising:
   collecting a set of behaviors to be detected belonging to a same session within a preset time window;
   labeling data indicative of each behavior in the set of behaviors to be detected to identify attribute information of each behavior, wherein the labeling data indicative of each behavior is based on one or more types of fields in the data indicative of each behavior;
   constructing label features of the set of behaviors to be detected based on labels of all behaviors in the set of behaviors to be detected, wherein the constructing label features comprises performing statistical computation on the labels of all behaviors in the set of behaviors to be detected;
   converting the label features into embedded features by a preset embedded feature extracting model, wherein the converting the label features into the embedded features comprises converting high dimensional label features into dense low-dimensional embedded features;
   determining, based on the embedded features corresponding to the label features of the set of behaviors to be detected and embedded features of a pre-acquired set of historical behaviors, whether there is abnormality in the set of behaviors to be detected; and
   generating an abnormality alarm and presenting the labels of the behaviors in response to determining that there is abnormality in the set of behaviors to be detected.

2. The method according to claim 1, wherein the labeling data indicative of each behavior in the set of behaviors to be detected to identify the attribute information of each behavior, and constructing the label features of the set of behaviors to be detected according to the labels of all behaviors in the set of behaviors to be detected, comprises:
   labeling, according to a preset set of labels, a plurality of target fields in each behavior in the set of behaviors to be detected respectively, to obtain a label corresponding to each behavior;
   acquiring a number of times for which each label in the preset set of labels appears among the labels of respective behaviors in the set of behaviors to be detected; and
   constructing, according to the number of times for which each label in the preset set of labels appears, the label features of the set of behaviors to be detected.

3. The method according to claim 2, wherein the constructing, according to the number of times for which each label in the preset set of labels appears, the label features of the set of behaviors to be detected, comprises:
   ranking, in a preset label order, the number of times for which each label in the preset set of labels appears, to obtain a first sequence; and
   mapping, according to a preset mapping relationship, each numerical value in the first sequence, to obtain a second sequence as the label features of the set of behaviors to be detected.

4. The method according to claim 1, wherein the determining, based on the embedded features corresponding to the label features of the set of behaviors to be detected and the embedded features of the pre-acquired set of historical behaviors, whether there is abnormality in the set of behaviors to be detected, comprises:
   employing, with respect to the embedded features of the set of behaviors to be detected, a preset clustering model to perform incremental clustering on a basis of a clustering result for the embedded features of the set of historical behaviors, wherein the clustering result for the embedded features of the set of historical behaviors includes a normal behavior category and an abnormal behavior category, and a number of samples in the abnormal behavior category is smaller than a preset threshold number of samples; and
   determining that there is abnormality in the set of behaviors to be detected, when the embedded features of the set of behaviors to be detected are added to the abnormal behavior category, or the embedded features of the set of behaviors to be detected do not belong to any of the categories.

5. The method according to claim 1, wherein the determining, based on the embedded features corresponding to the label features of the set of behaviors to be detected and the embedded features of the pre-acquired set of historical behaviors, whether there is abnormality in the set of behaviors to be detected, comprises:
   employing an AutoEncoder model to encode and decode the embedded features of the set of behaviors to be detected, to obtain an output result, wherein the AutoEncoder model is obtained by training on the embedded features of the set of historical behaviors; and
   determining, according to an error between the output result and the embedded features of the set of behaviors to be detected, whether there is abnormality in the set of behaviors to be detected.

6. The method according to claim 1, wherein the embedded features of the set of historical behaviors includes embedded features of at least one set of historical abnormal behaviors; the determining, based on the embedded features corresponding to the label features of the set of behaviors to be detected and the embedded features of the pre-acquired set of historical behaviors, whether there is abnormality in the set of behaviors to be detected, comprises:
   acquiring a similarity between the embedded features corresponding to the label features of the set of behaviors to be detected and the embedded features of the set of historical abnormal behaviors; and
   determining, according to the similarity, whether there is abnormality in the set of behaviors to be detected.

7. The method according to claim 2, wherein the preset set of labels includes label subsets corresponding to different target fields; correspondingly, the labeling, according to the preset set of labels, a plurality of target fields in each behavior in the set of behaviors to be detected respectively, comprises:

matching, according to a preset matching rule, any target field of any behavior with a label subset corresponding to the target field, and determining a target label corresponding to the target field.

8. The method according to claim 7, wherein the target field includes one or more selected from a group consisting of: a program name field, a source IP field, a destination IP field, a port field, a file path field and a file name field.

9. The method according to claim 8, wherein the method further comprises:

acquiring a plurality of pieces of historical behavior data, and extracting program name fields in the historical behavior data; and employing a preset language model to acquire labels corresponding to respective program name fields, and constructing a label subset corresponding to the program name fields.

10. The method according to claim 1, wherein the embedded feature extracting model is obtained through training by:

acquiring a plurality of sets of historical behaviors of different categories, acquiring label features of each set of historical behaviors, and taking label features of the plurality of sets of historical behaviors as training data; and inputting the training data into the embedded feature extracting model, acquiring embedded features corresponding to the respective training data, back-propagating the embedded feature extracting model according to the embedded features corresponding to the respective training data and a triplet loss function, and adjusting model parameters of the embedded feature extracting model, to eventually obtain a trained embedded feature extracting model.

11. The method according to claim 1, wherein the embedded feature extracting model employs an encoder in a Transformer model.

12. An electronic device, comprising:

at least one memory configured to store computer-executable instructions; and at least one processor configured to execute the computer-executable instructions stored in the memory, wherein the computer-executable instructions, when executed by the at least one processor, causes the at least one processor to perform operations comprising:

collecting a set of behaviors to be detected belonging to a same session within a preset time window;

labeling data indicative of each behavior in the set of behaviors to be detected to identify attribute information of each behavior, wherein the labeling data indicative of each behavior is based on one or more types of fields in the data indicative of each behavior;

constructing label features of the set of behaviors to be detected based on labels of all behaviors in the set of behaviors to be detected, wherein the constructing label features comprises performing statistical computation on the labels of all behaviors in the set of behaviors to be detected;

converting the label features into embedded features by a preset embedded feature extracting model, wherein the converting the label features into the embedded features comprises converting high dimensional label features into dense low-dimensional embedded features;

determining, based on the embedded features corresponding to the label features of the set of behaviors to be detected and embedded features of a pre-acquired set of historical behaviors, whether there is abnormality in the set of behaviors to be detected; and generating an abnormality alarm and presenting the labels of the behaviors in response to determining that there is abnormality in the set of behaviors to be detected.

13. The electronic device according to claim 12, wherein the labeling data indicative of each behavior in the set of behaviors to be detected to identify the attribute information of each behavior, and constructing the label features of the set of behaviors to be detected according to the labels of all behaviors in the set of behaviors to be detected, comprises:

labeling, according to a preset set of labels, a plurality of target fields in each behavior in the set of behaviors to be detected respectively, to obtain a label corresponding to each behavior;

acquiring a number of times for which each label in the preset set of labels appears among the labels of respective behaviors in the set of behaviors to be detected; and constructing, according to the number of times for which each label in the preset set of labels appears, the label features of the set of behaviors to be detected.

14. The electronic device according to claim 13, wherein the constructing, according to the number of times for which each label in the preset set of labels appears, the label features of the set of behaviors to be detected, comprises:

ranking, in a preset label order, the number of times for which each label in the preset set of labels appears, to obtain a first sequence; and mapping, according to a preset mapping relationship, each numerical value in the first sequence, to obtain a second sequence as the label features of the set of behaviors to be detected.

15. The electronic device according to claim 12, wherein the determining, based on the embedded features corresponding to the label features of the set of behaviors to be detected and the embedded features of the pre-acquired set of historical behaviors, whether there is abnormality in the set of behaviors to be detected, comprises:

employing, with respect to the embedded features of the set of behaviors to be detected, a preset clustering model to perform incremental clustering on the basis of a clustering result for the embedded features of the set of historical behaviors, wherein the clustering result for the embedded features of the set of historical behaviors includes a normal behavior category and an abnormal behavior category, and a number of samples in the abnormal behavior category is smaller than a preset threshold number of samples; and determining that there is abnormality in the set of behaviors to be detected, when the embedded features of the set of behaviors to be detected are added to the abnormal behavior category, or the embedded features of the set of behaviors to be detected do not belong to any of the categories.

16. The electronic device according to claim 12, wherein the determining, based on the embedded features corresponding to the label features of the set of behaviors to be detected and the embedded features of the pre-acquired set of historical behaviors, whether there is abnormality in the set of behaviors to be detected, comprises:

employing an AutoEncoder model to encode and decode the embedded features of the set of behaviors to be detected, to obtain an output result, wherein the Auto- Encoder model is obtained by training on the embedded features of the set of historical behaviors; and determining, according to an error between the output result and the embedded features of the set of behaviors to be detected, whether there is abnormality in the set of behaviors to be detected.

17. The electronic device according to claim 12, wherein the embedded features of the set of historical behaviors includes embedded features of at least one set of historical abnormal behaviors; the determining, based on the embedded features corresponding to the label features of the set of behaviors to be detected and the embedded features of the pre-acquired set of historical behaviors, whether there is abnormality in the set of behaviors to be detected, comprises:

acquiring a similarity between the embedded features of the set of behaviors to be detected and the embedded features of the set of historical abnormal behaviors; and determining, according to the similarity, whether there is abnormality in the set of behaviors to be detected.

18. The electronic device according to claim 13, wherein the preset set of labels includes label subsets corresponding to different target fields; correspondingly, the labeling, according to the preset set of labels, a plurality of target fields in each behavior in the set of behaviors to be detected respectively, comprises:

matching, according to a preset matching rule, any target field of any behavior with a label subset corresponding to the target field, and determining a target label corresponding to the target field.

19. The electronic device according to claim 18, wherein the target field includes one or more selected from a group consisting of: a program name field, a source IP field, a destination IP field, a port field, a file path field and a file name field.

20. A non-transitory computer-readable storage medium, having stored therein computer-executable instructions which, when executed by a processor, cause the processor to perform operations comprising:

collecting a set of behaviors to be detected belonging to a same session within a preset time window;

labeling data indicative of each behavior in the set of behaviors to be detected to identify attribute information of each behavior, wherein the labeling data indicative of each behavior is based on one or more types of fields in the data indicative of each behavior;

constructing label features of the set of behaviors to be detected based on labels of all behaviors in the set of behaviors to be detected, wherein the constructing label features comprises performing statistical computation on the labels of all behaviors in the set of behaviors to be detected;

converting the label features into embedded features by a preset embedded feature extracting model, wherein the converting the label features into the embedded features comprises converting high dimensional label features into dense low-dimensional embedded features;

determining, based on the embedded features corresponding to the label features of the set of behaviors to be detected and embedded features of a pre-acquired set of historical behaviors, whether there is abnormality in the set of behaviors to be detected; and generating an abnormality alarm and presenting the labels of the behaviors in response to determining that there is abnormality in the set of behaviors to be detected.

\* \* \* \* \*